Oct. 23, 1923.
J. M. TOWLE
1,471,427
AUTOMATIC HOSE COUPLING
Filed May 6, 1920
2 Sheets-Sheet 1
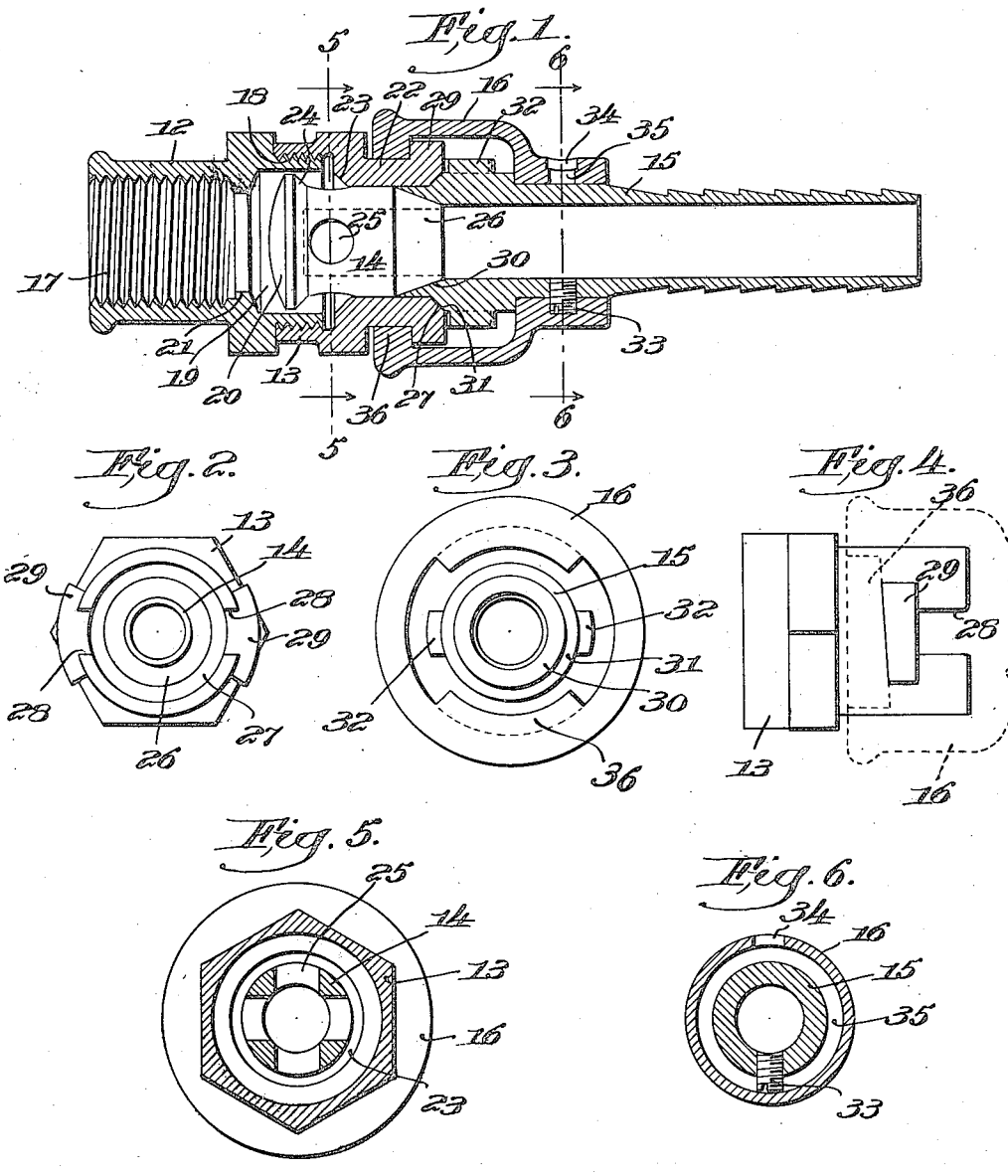

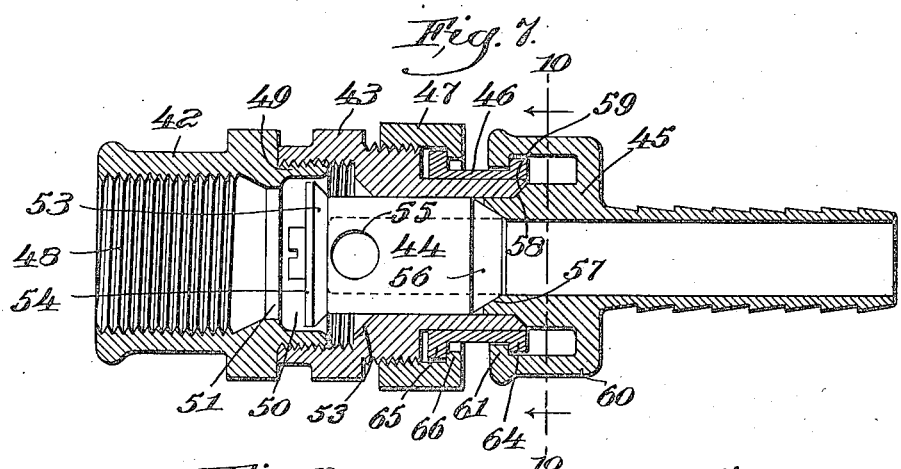
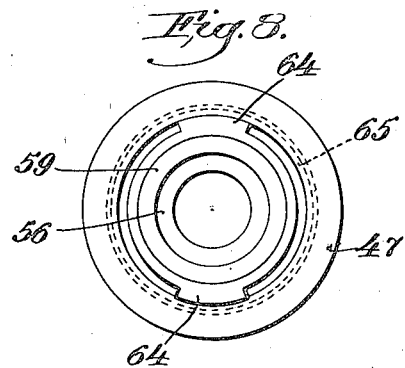
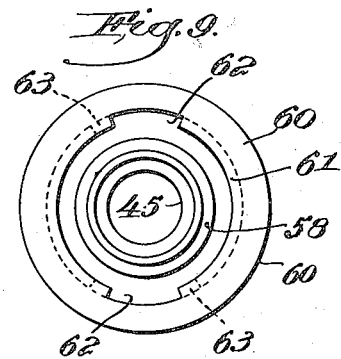
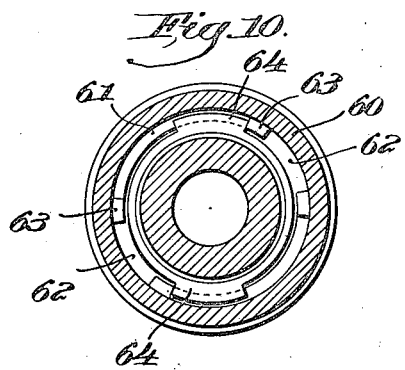
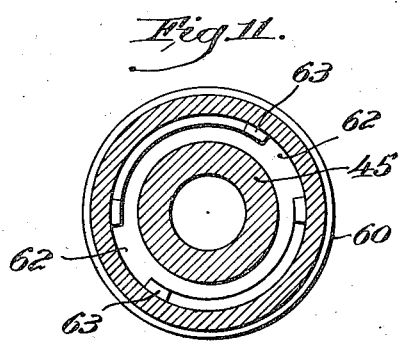

Patented Oct. 23, 1923.

1,471,427

UNITED STATES PATENT OFFICE.

JAMES M. TOWLE, OF WEST SOMERVILLE, MASSACHUSETTS, ASSIGNOR OF ONE-HALF TO LOUIS I. BECKWITH, OF BOSTON, MASSACHUSETTS.

AUTOMATIC HOSE COUPLING.

Application filed May 6, 1920. Serial No. 379,219.

*To all whom it may concern:*

Be it known that I, JAMES M. TOWLE, a citizen of the United States of America, and resident of West Somerville, in the county of Middlesex and State of Massachusetts, have invented new and useful Improvements in Automatic Hose Couplings, of which the following is a specification.

My invention relates to an improved hose coupling and more particularly to a combination coupling and valve particularly adapted for use on high pressure air lines or similar lines carrying other fluids.

In the use of compressed air in shipbuilding, structural work, mining or quarrying, it is customary to lead the power from fixed headers by flexible hose lines which are formed of sections so that the length may be varied as the exigencies of the work require. It is necessary to provide these hose lengths with an air-tight coupling and it is highly desirable that the coupling also contain a valve. If such valves are not provided a change in the length of the line or a change of tools may require a lengthy or arduous trip to the header to cut off the flow of air. Further, if such valves are not provided the workman will often stop the flow by kinking the line or by some similar device equally injurious to the hose and likely to cause loss of power. Since the hose lines are often moved over rough ground and over obstacles the couplings should present a relatively smooth exterior to prevent catching or tangling the lines. In order to positively prevent loss of power the valves in the couplings should be automatic in their action.

It is an object of my invention to provide a coupling which is simple and positive in its action and which may be readily coupled or uncoupled. It is also an object of the invention to provide, in connection with such a coupling, an improved valve which is opened by the operation of the coupling and which is closed automatically by the air pressure in the hose when uncoupled. It is a further object to provide a coupling wherein there is an air-tight connection between the two coupling members and between the valve and coupling members, and where such connection is maintained without the use of springs or similar parts. It is an additional object to provide a combined valve and coupling which is composed of but few and strong parts and which is economical in manufacture. Other and further objects will appear as the description proceeds.

I have illustrated certain preferred embodiments of my invention in the accompanying drawings, in which—

Figure 1 is a longitudinal section of one form of the device;

Figure 2 is an end view of the outlet coupling;

Figure 3 is an end view of the intake coupling;

Figure 4 is a view of the connector member, with portions of the intake coupling indicated in dotted lines;

Figure 5 is a cross section on line 5—5 of Fig. 1;

Figure 6 is a cross section on line 6—6 of Fig. 1;

Figure 7 is a view similar to Fig. 1 but showing a modified form of the device;

Figure 8 is an end view of the outlet coupling of Fig. 7;

Figure 9 is an end view of the intake coupling of Fig. 7;

Figure 10 is a cross section on the line 10—10 of Fig. 7; and

Figure 11 is a cross section on the line 10—10 of Fig. 7 with the outlet member disconnected.

Considering first the form of my device shown in Figs. 1 to 6, the coupling comprises the outlet bushing 12, connector member 13, tubular valve 14, the intake member 15 and lock member 16. The outlet bushing 12 is shown as internally threaded at 17 for connection to a power outlet, and as externally threaded at 18 for connection with the connector member 13. The interior of the bushing is cup shaped at 19 to receive the head 20 of the valve 14, and is provided with the circumferential ridge 21 adapted to prevent the valve entirely leaving its seat.

The connector member 13 has an enlarged end screw threaded internally to interfit with the threaded portion 18 of the outlet bushing 12, and has the reduced portion 22 adapted to receive the valve member 14. This reduced portion 22 is formed with the beveled seat 23 at its intake side adapted to receive the beveled surface 24 of the valve 14 and its outlet end is provided with a similar bevel 27.

The outer portion of the outlet end of the member is oppositely slotted at 28 and adjacent each such slot is provided a cam locking lug 29, as best shown in Fig. 4.

The valve 14 is tubular in form with the solid head 20 and the ports 25 extending through the side adjacent the head. The open end of the valve is exteriorly beveled at 26.

The intake member 15 has its intake end interiorly beveled at 30 to interfit with the bevel 26 on the valve member 14 and is exteriorly beveled at 31 to interfit with the beveled seat 27 on the connector member 13. Adjacent the bevel 31 the member carries the oppositely spaced lugs 32 which are adapted to fit the slots 28 on the connector member.

The lock member 16 is retained upon the intake member 15 by means of the stud 33 which is screwed in through the opening 34 and fits in the channel 35. This stud permits relative rotary movement of the two members but prevents longitudinal movement.

The forward portion of the lock member carries the inwardly extending lock lugs 36, adapted to coact with the lock lugs 29 in the connector member as indicated on Fig. 4.

The form of the device shown in Figs. 7 and 11 is similar to that just described except for the method of connection. It comprises the outlet bushing 42, connector member 43, tubular valve 44, intake member 45, sleeve 46 and collar 47. The outlet bushing is internally threaded at 48 and externally threaded at 49, and has the cup shaped interior 50 and the circumferential ridge 51 between the cup 50 and threads 48. The connector member 43 is screwed onto the threads at 49 and has the beveled seat 52 to coact with the bevel 53 on the solid head 54 of the valve 44. The tubular valve has the lateral ports 55 and its open end is externally beveled at 56 to fit the internal bevel 57 on the intake member 45. The intake member 45 is also externally beveled at 58 to fit the internal bevel 59 in the end of the connector member.

The intake member 45 is provided with the outwardly and forwardly extending flange 60, the forward edge of which has the inwardly extending lip 61. This lip is oppositely slotted at 62 as shown in Fig. 9, and has the rearwardly extending lugs 63 adjacent each side of each slot. The sleeve 46 is formed with the outwardly extending lugs 64 adapted to pass through the slots 62 and to be turned beyond the lugs 63 and brought up against the lip 61 and then retained against rotation by the lugs 63. The opposite end of the sleeve 46 has the outwardly extending lip 65 which coacts with the inwardly extending lip 66 on the collar 47.

In the use of either form of my device the outlet bushing together with the connector member and valve normally remain attached to the terminal of the source of supply or the outlet end of a hose section. In using the form shown in Figs. 7 to 11 the sleeve and collar also normally remain with the outlet bushing. The intake member in each case is carried by the intake end of a hose or pipe section, and in the form of Figs. 1 to 6, the lock member remains with it.

In both forms of the device the tubular valve is closed against its seat in the connector member by the air pressure against the solid valve head when the intake member is disconnected. The ridges 21 or 51 prevent the valve from entirely leaving its housing even when no pressure is in the line, and maintain the valve in position to be instantly closed by the pressure against its head when air again fills the line. This is automatically accomplished by the air pressure alone without the use of springs or similar devices.

When the intake member is connected to the outlet assembly the bevel on the open end of the valve interfits with the corresponding bevel in the outlet member and the valve is unseated sufficiently for the air to pass around the valve head and through the lateral openings in the valve and thus through the intake member. The outer bevel on the intake member also seats upon the bevel on the end of the connector member and thus forms an air tight joint.

The two forms of the device differ in so far as the means for locking the outlet and intake assemblies together are concerned. In the form shown in Figs 1 to 6, the two parts are brought together so that the lugs 32 fit into the slots 28 and the cam lugs 29 pass through the spaces between the lugs 36. The lock member is now rotated and the cam surfaces of the lugs 36 and 29 engage to draw the connector and intake members into intimate engagement. The lugs 28 serve to prevent rotation of the intake member and thus prevent scoring or wear of the meeting beveled surfaces, and also prevents twist of the hose line.

In connecting the form of the device shown in Figs. 7 to 11, the collar 47 is first loosened somewhat on the outlet assembly, and the intake member is then moved into engagement, the lugs 64 passing through the slots 62 and being turned to fit between the lugs 63. The bevel seat 57 interfits with the bevel end 56 of the valve and the collar 47 is now screwed up and the lugs 64 press against the lips 61 to draw the intake member into intimate engagement with the connector member. This movement of the intake member also serves to unseat the tubular valve.

The method of assembling the couplings is obvious from the drawings. In the form of Figs. 1 to 6, the lock member is disconnected from the intake member by turning the two until the stud 33 may be removed through the hole 34. In the form of Figs. 7 to 11, the lugs 64 on the sleeve are of less size than the interior diameter of the lip 66 on the collar 47 so that the two parts may be readily separated.

The form of the device shown in Figs. 1 to 6 is somewhat simpler in construction and quicker in operation than the form of Figs. 7 and 11, the latter form being particularly adapted for use with larger lines where a more positive or tighter lock is desired. The form shown in Figs. 1 to 6 may be used on small lines or lines where relatively low pressures are used so that the thrust on the head of the valve is not too great to permit the valve to be unseated by the manual movement of the intake member. However, in larger lines or very high pressure lines the valve will be seated with such a heavy thrust that mechanical leverage is necessary to unseat it. This leverage is provided by the screw collar 47 of the form of Figs. 7 to 11. The valve is not unseated until that collar is screwed up on the connector member drawing with it the intake member by means of the sleeve 46. In this manner the valve may be unseated under heavy pressure and an intimate and air tight contact between the meeting beveled surfaces is assured.

In both forms of my device the air is permitted automatically to extend to the end of the line whenever new line is added and the valve at the end of the line automatically closes. Conversely when a length of line or a tool is disconnected the live end of the line is automatically shut off.

While I have described my coupling in connection with compressed air lines, it may obviously be used with lines carrying any fluid, and the double seating between the intake and the valve and the intake and the connector member serves to effectively prevent loss of fluid or of pressure. The coupling presents an exterior comparatively smooth and without projections. While I have shown the outlet bushing as screw threaded and the intake member as corrugated, they may obviously be varied to suit the particular use to which they are to be put.

I claim:—

1. A device of the class described comprising aligned elements constructed and arranged for the attachment of conduits thereto, and an intermediate element having substantially conical annular seats adjacent each end thereof.

2. A device of the class described comprising a connector member having a valve therein, a sleeve encircling a portion of said member, radially directed elements extending outwardly from opposite ends of said sleeve, a collar having screw threaded engagement with said connector member and having lugs engageable with said radial elements at one end of the sleeve, and an intake member provided with inwardly directed parts engageable with the said radial elements at the opposite end of the sleeve.

3. A device of the class described comprising an outlet bushing, a connector member having a tubular valve opening and a valve seat adjacent said opening, a tubular valve in said opening having a solid head and a beveled open end, the solid head being normally seated against the valve seat, the connector member having an open end and a cone seat adjacent said end, and an intake member having a cone seat adapted to interfit with the beveled open end of the valve and having a beveled portion adapted to interfit with the cone seat adjacent the open end of the connector member, the intake member when so interfitted forming a substantially air tight connection with the tubular valve and with the connector member.

4. A device of the class described comprising an outlet bushing, a connector member having a tubular valve opening and a valve seat adjacent said opening, a tubular valve in said opening having a solid head and a beveled open end, the solid head being normally seated against the valve seat, the connector member having an open end and a cone seat adjacent said end, and an intake member having a cone seat adapted to interfit with the beveled open end of the valve and having a beveled portion adapted to interfit with the cone seat adjacent to the open end of the connector member, the intake member when so interfitted being adapted to unseat the valve and forming a substantially air tight connection with the tubular valve and with the connector member, and means adapted to detachably connect the connector member and intake member.

5. A coupling device comprising a pair of coupling members and a connector sleeve therefor, one of the coupling members having a cylindrical portion formed with guide grooves and exterior circumferentially extending ribs, the other coupling member having a portion fitting within the first and being provided with projecting lugs engaging the grooves, and the connector sleeve having a portion interlocking with the second coupling member and having portions interengaging with the ribs of the first member for securing the parts together.

Signed by me at Boston, Massachusetts, this twenty-ninth day of April, 1920.

JAMES M. TOWLE.